June 8, 1965 F. B. HOFF, JR., ET AL 3,188,490
POWER CONTROL CIRCUIT UTILIZING A PHASE SHIFT NETWORK FOR
CONTROLLING THE CONDUCTION TIME OF THYRATRON TYPE DEVICES
Filed April 3, 1962 5 Sheets-Sheet 1

INVENTOR.
FREDERICK B. HOFF JR.
JEARLD L. HUTSON
BY

ATTORNEY

June 8, 1965 F. B. HOFF, JR., ETAL 3,188,490
POWER CONTROL CIRCUIT UTILIZING A PHASE SHIFT NETWORK FOR
CONTROLLING THE CONDUCTION TIME OF THYRATRON TYPE DEVICES
Filed April 3, 1962 5 Sheets-Sheet 5

INVENTORS
FREDERICK B. HOFF JR.
JEARLD L. HUTSON
BY
ATTORNEY

United States Patent Office 3,188,490
Patented June 8, 1965

3,188,490
POWER CONTROL CIRCUIT UTILIZING A PHASE SHIFT NETWORK FOR CONTROLLING THE CONDUCTION TIME OF THYRATRON TYPE DEVICES
Frederick B. Hoff, Jr., and Jearld L. Hutson, Richardson, Tex., assignors to Hunt Electronics Company, Dallas, Tex., a corporation of Texas
Filed Apr. 3, 1962, Ser. No. 184,841
15 Claims. (Cl. 307—88.5)

The present invention relates to switching circuits and, more particularly, to switching circuits that utilize thyratron type devices for controlling the power applied to a load.

Gas tubes known as thyratrons have been used for many years for controlling the power applied to loads. One of the characteristics of the thyratron is that it may be switched from a normally high impedance state to a very low impedance state by causing the tube to break down or fire. Once the tube fires, it will remain in the low impedance state so long as the anode is more positive than the cathode of the tube.

One of the methods used for achieving power control by the use of thyratron type devices is to vary the phase angle of the firing signal with respect to the A.C. voltage applied to the load, causing the thyratron to conduct for a desired portion of a half-cycle of the applied A.C. voltage.

Various types of semiconductor devices which exhibit a thyratron type switching action have been developed. A solid state semiconductor device known as the control rectifier is disclosed in U.S. Patent #2,877,359 issued March 10, 1959. The control rectifier is the solid state equivalent of the gas thyratron. A four layer semiconductor diode which is the solid state equivalent of the hot cathode gas diode is disclosed in Patent #2,855,524 which issued to W. Shockley on October 7, 1958. These two devices are unilateral. That is, they conduct in only one direction, as do the gas thyratron or the gas diode. Multilayer semiconductor devices which exhibit a thyratron type action but conduct in two directions are also known.

Other types of devices which exhibit a thyratron type breakdown include gas diodes and neon tubes.

The present invention is especially adapted for controlling the above described semiconductor devices. By using the present invention in conjunction with such semiconductor devices, it is possible to control relatively large amounts of power with apparatus of small size that dissipate very small amounts of power. The combination of small size and low power dissipation allows power control circuits utilizing thyratron type semiconductor devices to be packaged in small, convenient sizes and make it feasible to use such systems, for example, for the control of light intensity in a home lighting system. Moreover, the invention may also advantageously be employed in applications utilizing thyratrons or similar devices which may be energized to cause the device to switch from a normally high impedance state to a low impedance state.

In practicing the present invention, a resistance-capacitance phase shift network is utilized to produce a firing signal of different phase angle than the voltage applied to the load. One embodiment of the invention is especially adapted for use with devices whose switching action is controlled by the bias voltage applied to a control electrode. According to this embodiment of the invention, the firing signal is applied to the primary of a transformer. The secondary winding of the transformer is connected to the control electrode of an asymmetrical device such as a thyratron or controlled rectifier, which controls the flow of current through a load. By using a transformer having two secondary windings and connecting the second of the secondary windings to the control electrode of an oppositely poled asymmetrical device, only one phase shift network and only one transformer is required to achieve full wave power control. One symmetrical device having two control electrodes may be used instead of the two oppositely poled, asymmetrical devices.

Another embodiment of the invention is especially adapted for use with two terminal thyratron type devices. Two terminal devices which exhibit a thyratron type breakdown are normally fired by exceeding the forward breakdown voltage of the device. According to this embodiment of the invention, the secondary winding of the transformer is connected in series with a two terminal device which controls the flow of current through the load. A capacitor is connected in series with the primary winding of the transformer and a second two terminal device is connected in parallel with the primary winding of the transformer and the capacitor. The firing signal produced by the phase shift network is applied to the parallel circuit thus described. In operation of the second embodiment of the invention, at such time as the second two terminal device breaks down, energy stored in the capacitor discharges through the primary winding of the transformer to produce a high voltage pulse in the secondary winding sufficient to break down the two terminal device that controls the flow of current through the load. Once the two terminal device which controls the power applied to the load is switched to the low impedance state, the line voltage is sufficient to maintain it in its low impedance state until near the end of the half cycle. The second thyratron type device is chosen to have a forward breakdown characteristic that will allow conduction for the desired portion of the firing signal.

Many objects and advantages of the invention will become apparent as the following detailed description of particular embodiments of the invention unfold when taken in conjunction with the appended drawings wherein like reference characters denote like parts, and in which:

FIGURE 1 schematically illustrates an embodiment of the invention which utilizes two terminal, asymmetrical devices for half-wave control of power applied to a load;

FIGURES 2A–2E diagrammatically illustrate the manner in which the phase angle of the firing signal produced by the phase shifting network varies as the components of the phase shift network are varied;

Figure 3A:
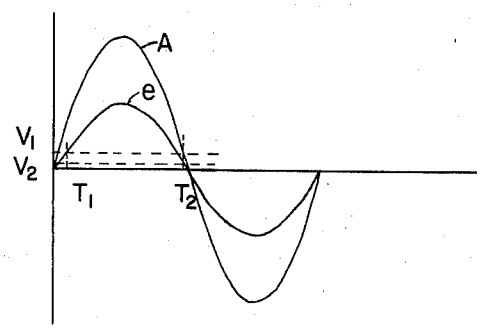
FIGURES 3A–3F illustrate the relationship between applied voltage and the firing signal as the components of the phase shift network are varied.

Turning now to FIGURE 1 of the drawing, an embodiment of the present invention utilizing two terminal, asymmetrical devices to achieve half-wave power control is illustrated. The line voltage is connected through a lead 10 to a load 12, which may be an incandescent lamp, a motor, or other power consuming device. The other side of the load 12 is connected by line 14 to the over terminal of resistor $R_1$ and the over terminal of resistor $R_3$.

As shown, resistor $R_3$ is preferably of the variable type and is provided with a tap 18. Tap 18 of the variable resistor $R_3$ is connected through capacitor $C_1$ to line 16. The under side of resistor $R_1$ is connected through resistor $R_2$ to line 16. Line 16 connects to the line voltage.

The junction point 20 between the tap 18 of resistor $R_3$ and the capacitor $C_1$ is connected to one side of the primary winding 22 of the transformer 24. The other side of the primary winding 22 is connected through capacitor $C_2$ to junction point 26 between resistors $R_1$ and $R_2$. A two terminal four layer asymmetrical semiconductor device 30 is connected between point 20 and point 26 with the N-type region 32 of device 30 connected to point 26 and its P-type region 34 connected to point 20.

A second two terminal four layer asymmetrical semiconductor device 36 is utilized to control the power which flows through the load 12. As shown, the P-type region 38 of the device 36 is connected through line 40 to the load 12. The N-type region 46 of the device 36 is connected through secondary winding 44 of the transformer 24 to line 16. As connected, the device 36 can be switched to the low impedance state only during positive half cycles of the line voltage. That is, the portion of the cycle when line 10 is positive with respect to line 16.

Turning now to FIGURES 2A-2E of the drawing, the manner which varying the variable resistor $R_3$ varies, the phase relationship between the voltage produced between the junction points 20 and 26 and the applied line voltage will now be explained.

With line voltage applied to lines 10 and 16, a voltage $e$ is produced between the junction points 20 and 26 whose magnitude and phase depends upon the particular values of the resistors $R_1$, $R_2$ and $R_3$ and the capacitor $C_1$. As the resistance $R_3$ is varied, the phase angle between the voltage $e$ and the line voltage varies as shown in FIGURES 2A through 2E.

A current $i_1$ flows through resistors $R_1$ and $R_2$. Similarly, a current $i_2$ flows through the variable resistor $R_3$ and the capacitor $C_1$. As the vector sum of voltage $i_2 X_c$ and voltage $i_2 R_3$ is always equal to the voltage across the phase shift network, the relative impedance of capacitor $C_1$ and resistor $R_3$ determines the phase angle $\theta$ of voltage $e$. The resistors $R_1$ and $R_2$ function as a voltage divider network. If $R_1$ is equal to $R_2$, the voltage $e$ will be of a constant magnitude equal to one-half the instantaneous value of the line voltage applied without regard to the phase angle.

If there is a substantial difference between the resistance of resistors $R_1$ and $R_2$, the magnitude of the voltage $e$ will vary depending upon the phase angle $\theta$ and the relative resistance of resistors $R_1$ and $R_2$, as shown in FIGURES 2D and 2E. Thus, if $R_1$ is much larger than $R_2$, the firing signal $e$ will be substantially equal to the applied line voltage when the phase angle $\theta$ is small and $e$ will be much smaller than the applied line voltage if the phase angle $\theta$ is large.

The relationship between the applied voltage and the firing signal $e$ developed by the phase shift network can perhaps be more fully understood by reference to the wave forms illustrated in FIGURES 3A through 3F. In FIGURES 3A through 3F, the curve A represents the wave form of the applied line voltage, the curve $e$ represents the wave form of the firing signal $e$ developed by the phase shift network. The voltage level $V_1$ is the voltage level which the firing signal $e$ must attain to cause the thyratron type device which controls the flow of current through the load to switch to its low impedance state, the voltage level $V_2$ represents the minimum voltage level of line voltage necessary to produce the holding current to sustain conduction of the thyratron type device which controls the flow of current through the load. The time $T_1$ is the time at which the thyratron type device which controls the flow of current through the load will switch from its high impedance state to its low impedance state, and the time $T_2$ is the time at which the line voltage falls below that necessary to provide holding current. The conduction time of the device is the difference between $T_1$ and $T_2$.

Figure 3B:
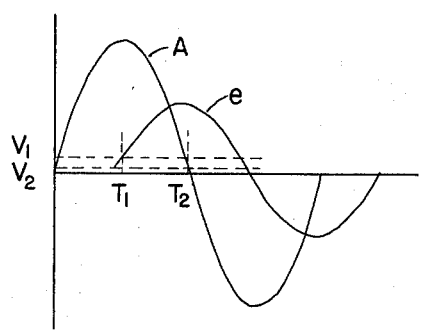
Figure 3C:
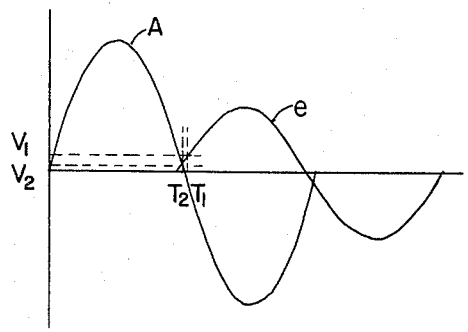

Turning now particularly to FIGURES 3A through 3C of the drawings, it is recognized that the curves shown illustrate the relationship between the applied voltage A and the firing signal $e$ for the condition in which the resistance of resistor $R_1$ is equal to the resistance of resistor $R_2$. As described earlier, under this condition the instantaneous magnitude of the firing signal $e$ is one-half of the instantaneous magnitude of the applied voltage A.

When the resistance of resistor $R_3$ is very small, the firing signal $e$ will be substantially in phase with the applied voltage A, as shown in FIGURE 3A. If the voltage levels $V_1$ and $V_2$ are relatively low, the time $T_1$ will be very short whereas the time $T_2$ will be very near the end of the half cycle. Current will flow through the load for substantially a complete positive half cycle.

As the resistance of the variable resistor $R_3$ is increased causing the firing signal $e$ to lag behind the applied voltage A, the time $T_1$ will increase, decreasing the time that current will be allowed to flow through the load. At such time as the phase angle $\theta$ by which the firing signal $e$ lags behind the applied voltage A becomes such that the time $T_1$ is equal to or greater than the time $T_2$, the thyratron type device which controls the flow of current through the load will remain off for the entire duration of the positive half cycle and no current will be allowed to flow through the load.

From the above, it is evident that the firing signal $e$ does not necessarily have to lag behind the applied voltage A for a complete 180° to maintain the thyratron type device which controls the flow of current through the load in the off condition for the entire period of the positive half cycle of the applied voltage A.

The importance of this is obvious when it is considered that although it is a simple matter to provide a potentiometer which is adjustable to zero resistance to cause the firing signal $e$ to be in phase with the applied voltage A, it would be difficult to obtain potentiometer easily adjustable from zero resistance to infinite resistance as would be required to cause the firing signal $e$ to lag behind the applied voltage A by a complete 180°. As a practical matter, the capacitor $C_1$ and the resistor $R_3$ are chosen to provide a maximum phase angle $\theta$ such that time $T_1$ will be only slightly greater than $T_2$.

Figure 3D:
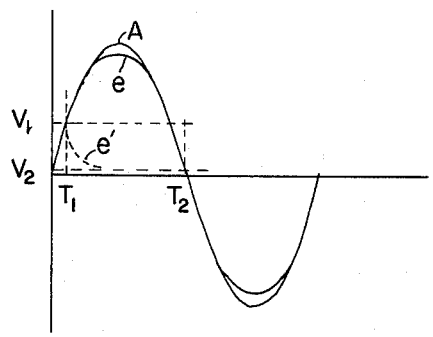
Figure 3E:
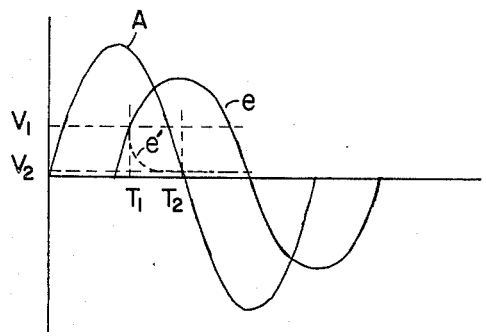
Figure 3F:
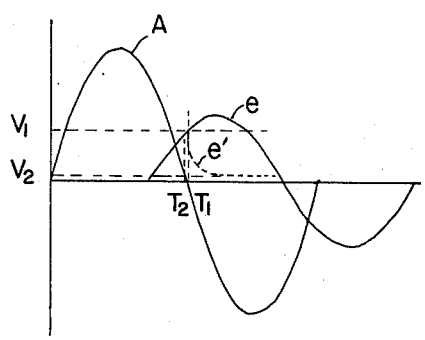

FIGURES 3D through 3F illustrate the relationship between the applied voltage A and the firing signal $e$ produced by the phase shift network if the resistance of resistor $R_1$ is substantially greater than the resistance of resistor $R_2$.

As shown in FIGURE 3D, when the resistance of resistor $R_3$ is adjusted for a very low value, the firing signal $e$ will be substantially in phase with the applied voltage A and be of approximately the same magnitude. The absolute magnitude of the firing signal $e$ will decrease as resistor $R_3$ is adjusted to increase the phase angle $\theta$ by which the firing signal $e$ lags the applied voltage A. Due to the cumulative effect of the change in the phase angle $\theta$ and the decrease in the magnitude of the firing signal $e$, the time $T_1$ will be equal to or greater than the time $T_2$ when the phase angle $\theta$ between the firing signal $e$ and the applied voltage A is considerably less than 180°.

From the above, it is seen that if the voltage level $V_1$ is relatively low compared to the maximum instantaneous voltage of the firing signal $e$, that a phase shift network in which $R_1$ was equal to $R_2$ could be successfully utilized. On the other hand, if the voltage level $V_1$ necessary to produce conduction of the device controlling the flow of current through the load is relatively high compared to the maximum instantaneous value of the voltage $e$, it is preferred that the resistance of the resistor $R_1$ be considerably greater than the resistance of the resistor $R_2$.

Referring once again to FIGURE 1, the manner in which a specific example of the invention operates will now be described. The load 12 was a 300 watt incandescent light bulb having a resistance of approximately 0.248 ohms. The resistance of resistor $R_1$ was 22,000 ohms and that of resistor $R_2$ was 4,700 ohms. The capacitor $C_1$ had a capacitance of .47 microfarad whereas capacitor $C_2$ had a capacitance of 0.1 microfarad. The variable resistor $R_3$ was variable from a resistance of 0–22,000 ohms. The thyratron type device 30 was characterized by having a forward breakdown voltage of approximately 70 volts and the thyratron type device 36 was characterized by a forward breakdown voltage of approximately 180 volts. The primary winding 22 of the transformer 24 consisted of 10 turns of #24 AWG copper wire wound on a ¼″ powdered iron core. The secondary winding of the transformer 24 consisted of 130 turns of #24 AWG copper wire providing an inductance of approximately 200 microhenries in the secondary.

The variable resistor $R_3$ was adjusted for zero resistance and 110 volts A.C. was applied as the line voltage. During positive half cycles the capacitor $C_2$ was charged through the charge path provided by the primary winding 22 of the transformer 24 and the resistor $R_2$ until such time as the voltage $e$ exceeded the forward breakdown voltage of the device 30. As the firing signal $e$ attained a level of approximately 70 volts, the device 30 was switched to its low impedance state providing a low impedance to path for the discharge of capacitor $C_2$ through the primary winding 22.

The capacitor $C_2$ was charged to a voltage of approximately 65 volts. The rapid discharge of the capacitor $C_2$ allowed by the low impedance of device 30 produced a high current pulse which induced a high voltage pulse in the secondary winding 44 of the transformer 24. The effect of the breakdown of device 30 and the discharge of capacitor $C_2$ on the firing signal $e$ is shown by the dashed portion $e$ of curves 3D–3F.

The high voltage pulse produced by the discharge of the capacitor $C_2$ in conjunction with the applied line voltage was sufficient to break down the device 36 causing it to switch from its high impedance state to the low impedance state and allow current to flow through the load 12. Once the device 36 switched to its low impedance state, it continued in its low impedance state until the instantaneous value of the applied line voltage dropped to a very low value. Approximately 97% of full half wave power was applied to the load 12 under these conditions.

As the resistance of the variable resistor $R_3$ was increased from zero resistance, the time $T_1$ was increased due to the combined effect of the change in phase angle $\theta$ and the flattening of the curve of the firing signal $e$ decreasing the conduction time of the device 36 and thereby decreasing the effective power dissipated by the load 12. As the variable resistor $R_3$ was increased to approximately 22,000 ohms, the time $T_1$ increased to the point which it was greater than the time $T_2$ and the device 36 remained in its high impedance state for the entire duration of the cycle of applied line voltage. As the reverse breakdown voltage of the device 30 is much higher than the maximum instantaneous value of the firing signal $e$ and the reverse breakdown voltage of the device 36 is much higher than the maximum instantaneous value of the applied line voltage, during negative half cycles neither of the devices will switch to the low impedance state and no current will be allowed to flow through the load 12.

The advantage of using an unbalanced phase shift network in which resistor $R_1$ is greater than resistor $R_2$ is believed evident in view of the above description. By providing a firing signal $e$ of substantially the same magnitude as the applied voltage A when it is desired to utilize maximum power, it is possible to break the device 30 down much sooner in the cycle allowing the effective current flowing through the load 12 to be substantially equal to full half wave current. In addition, the higher voltages available allows the use of a device 30 having a relatively high forward breakdown voltage characteristic thereby allowing the capacitor $C_2$ to be charged to a higher voltage.

Commercially available devices which consistently break down at low levels are, at the present time, difficult to obtain and in addition, the inductance of the transformer 24 would have to be increased considerably to produce the necessarily high voltages across to secondary winding 44 if the capacitor $C_2$ were only charged to relatively low voltage. A further advantage is obtained in that the increase in time $T_1$ is a function not only in the change in the phase angle $\theta$, but also a function of the decrease in the instantaneous value of the firing voltage $e$ making it unnecessary to shift the phase angle $\theta$ a complete 180° and, therefore, allowing a smaller, less expensive potentiometer to be utilized as the resistor $R_3$.

Figure 4:
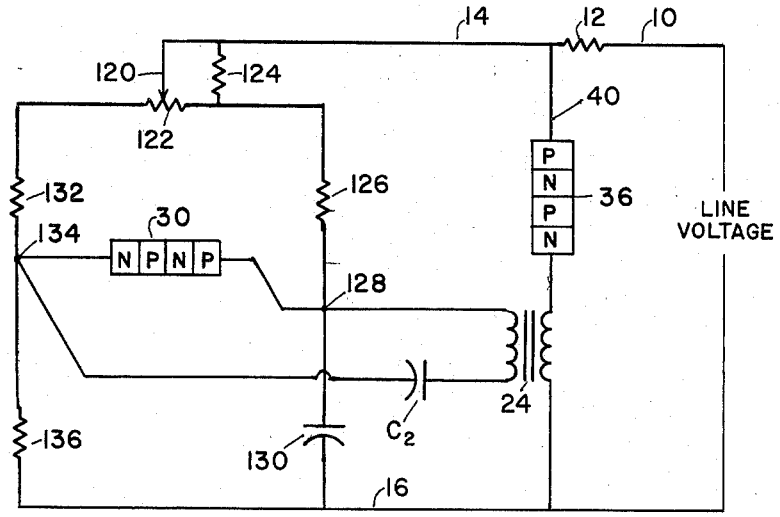
FIGURE 4 is a schematic illustration of another embodiment of the invention utilizing a different phase shift network.

The modified phase shift network shown in FIGURE 4 has been found to produce results improved above even that of the circuit shown in FIGURE 1. As shown in FIGURE 4, the line 14 is connected directly to the tap 120 of a variable resistor 122. Resistor 124 connects the tap 120 of the resistor 122 to the under terminal of resistor 122. The under terminal of the resistor 122 and the resistor 124 are connected through resistor 126 and capacitor 130 to line 16. The over terminal of the variable resistor 122 is connected to the over terminal of resistor 132. The under terminal of resistor 132 is connected through resistor 136 to line 16.

It is recognized from the above that the capacitor 130 corresponds to the capacitor $C_1$ of FIGURE 1 and the resistor 136 corresponds to the resistor $R_2$ of FIGURE 1. The junction 134 between resistor 132 and resistor 136 corresponds to the junction point 26 whereas the junction point 128 between resistor 126 and capacitor 130 corresponds to the junction point 20. That portion of the variable resistor 122 above the tap 120 plus the resistance of resistor 132 corresponds to resistor $R_1$ of FIGURE 1. The equivalent of resistor $R_3$ in FIGURE 1 is found in resistor 126 plus the resistance of the parallel circuit consisting of resistor 124 in parallel with a portion of resistor 122 underneath the tap 120.

According to one specific example of the above phase shift network used in conjunction with the device 30, transformer 24, capacitor $C_2$ and device 36 of FIGURE 1, the resistance of resistor 132 was 22,000 ohms and the resistance of resistor 136 was 4,700 ohms. Capacitor 130 had a capacitance of 0.47 microfarad and resistor 126 had a resistance of 300 ohms. The maximum resistance of the variable resistor 122 was 25,000 ohms while the resistance of resistor 124 was 15,000 ohms.

As the potentiometer tap 120 is moved, the effective value of the resistance which corresponds to the resistor $R_1$ and the resistance which corresponds to the resistor $R_3$ both change. Thus, when the tap 20 is positioned at the bottommost point, the effective value of the resistance which corresponds to the resistor $R_1$ will be the sum of the resistance 132 and the maximum value of the resistance 122. On the other hand, the resistor 124 will be short circuited by the tap 120 and the effective value of the resistance which corresponds to the resistor $R_3$ will be only 300 ohms, allowing the firing signal $e$ to be substantially in phase with the applied line voltage. Because of the great increase in the resistance which corresponds to the resistor $R_1$, the firing signal $e$ produced by the phase shift network of FIGURE 4 will be virtually equal to the applied line voltage.

As the tap 120 is moved upward, the effective value of the resistance which corresponds to the resistor $R_1$ will decrease and the effective value of the resistance which corresponds to the resistor $R_3$ will increase. The increase in the value of the resistance which corresponds to the resistor $R_3$ will cause the firing signal $e$ produced by the phase shift network to lag behind the applied line voltage and decrease in magnitude. In addition, the decrease in the effective value of the resistance which corresponds to resistor $R_1$ will further decrease the magnitude of the firing signal $e$.

It has been found that for some combinations of resistors and capacitors, taken in conjunction with the manner in which the voltage $e$ varies both because of the change in phase and the change in the effective value of the resistance which corresponds to the resistor $R_1$, that as the tap 120 of the resistor 122 is moved from the upper most position to the lower most position that the firing signal $e$ will initially decrease in magnitude and then begin to increase. It has been found that by placing a resistor 126 of small size between the resistor 122 and the junction point 128 that this problem can be alleviated.

The resistor 124 is not essential to the operation of the phase shift network shown in FIGURE 4. However, if the resistor 122 is of large value, as is desired to obtain the maximum firing signal $e$, and the tap 120 is moved to the upper most position, the phase angle of the firing signal $e$ will be over shifted to the extent that the tap 120 must be moved for some distance before the power will begin to flow through the load. This problem is alleviated by placing the resistor 124 in parallel with the lower portion of the resistor 122 thereby effectively decreasing the maximum value of the resistance which corresponds to the resistor $R_3$ and limiting the amount by which the phase angle $\theta$ of the firing signal $e$ can be shifted.

Figure 5:
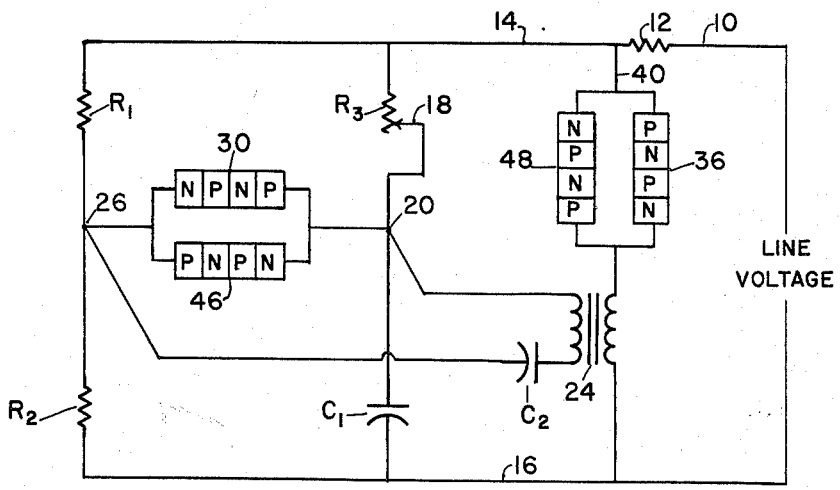
FIGURE 5 is a schematic diagram illustrating the manner in which two oppositely poled asymmetrical devices may be utilized to achieve full wave control of power.
Figure 6:
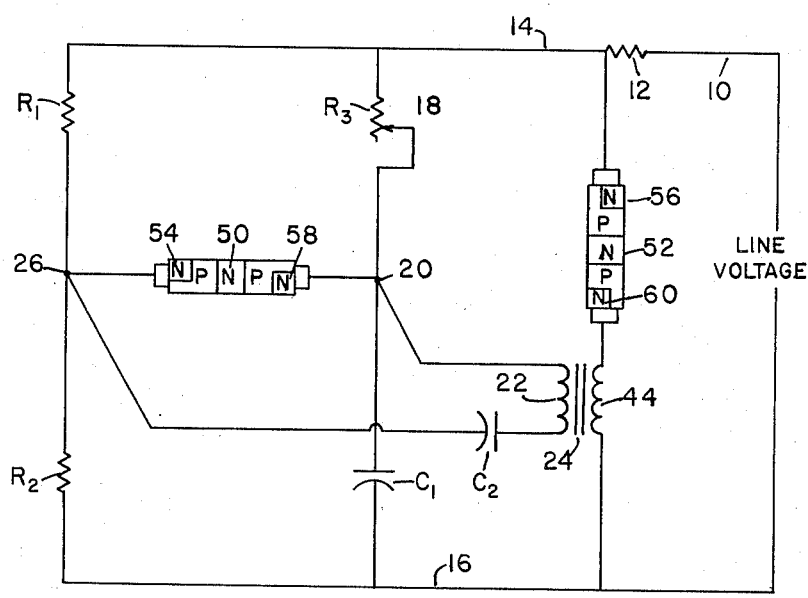
FIGURE 6 is a schematic diagram illustrating another embodiment of the invention utilizing two terminal symmetrical devices to achieve full wave control of the power applied to the load.

Although the invention has been described with reference to half wave operation in regard to FIGURE 1, it is readily adaptable to achieve full wave control of the power being applied to a load, as shown in FIGURES 5 and 6.

Full wave control of power can be achieved by adding an oppositely poled asymmetrical device 46 in parallel with the device 30 and an oppositely poled asymmetrical control device 48 in parallel with the device 36, as shown in FIGURE 5. The operation of the circuitry shown in FIGURE 5 is similar to that described with reference to FIGURE 1.

During positive half cycles, the circuit of FIGURE 5 will operate as described with reference to FIGURE 1. During negative half cycles, the capacitor $C_2$ will be charged through the charge path provided by resistors $R_2$ and $R_3$ and the primary winding 22. The device 46 will switch from its high impedance state to its low impedance state as the instantaneous magnitude of firing signal $e$ approaches 70 volts. When device 46 switches to its low impedance state, the capacitor $C_2$ will discharge inducing a voltage in secondary winding 44 sufficient to exceed the forward breakdown voltage of device 48 and all conduction during negative half cycles. The peak reverse voltage of device 30 and 46 is much higher than the peak voltage of the firing signal $e$ insuring that device 46 does not conduct during positive half cycles and that device 30 does not conduct during negative half cycles of the firing signal $e$. Similarly, the peak reverse voltage of devices 36 and 48 is sufficiently high to protect against breakdown of devices 36 and 48 during negative half cycles and positive half cycles respectively.

Similar results may be accomplished by using a symmetrical device such as the five layer semiconductor devices 50 and 52, illustrated in FIGURE 6.

The device 50 can be switched to allow conduction in either direction. Thus, when the line 10 is positive with regard to the line 16 current will flow in the direction from junction 20 to junction 26 charging the capacitor $C_2$. When the device 50 breaks down, it will provide an extremely low resistance path between points 26 and 20 to current flowing in the direction from junction 20 to junction 26. Thus, the capacitor $C_2$ will discharge in the manner described previously producing a high voltage pulse across secondary winding 44. On the occurrence of the high voltage pulse, the device 52 will break down to allow current flow through the load 12 toward line 16.

When line 10 goes negative with respect to line 16, the devices 52 and 50 will return to the high impedance state. The capacitor $C_2$ will then be charged in the opposite direction by the flow of current from junction point 26 to junction point 20 until the device 50 breaks down to allow free conduction through device 50 in a direction from junction 26 to junction 20. As before, the capacitor $C_2$ will then discharge, producing a high voltage pulse of proper polarity to cause the device 52 to break down and allow current to flow in the direction from line 16 toward line 10.

From the above, it is obvious that during positive half cycles, the N-type layer 54 of the device 50 and the N-type layer 60 of the device 52 function as cathodes, whereas during negative half cycles the N-type layer 58 of the device 50 and the N-type layer 56 of the device 52 function as the cathodes.

The particular embodiments of the invention described with reference to FIGURES 1, 5 and 6 of the drawings, are especially applicable for use in those systems utilizing a two terminal thyratron type device. Although the description was made with particular reference to particular certain semiconductor devices, other two terminal devices which exhibit thyratron type breakdown characteristics such as neon tubes can be utilized as the switching elements.

Figure 7:
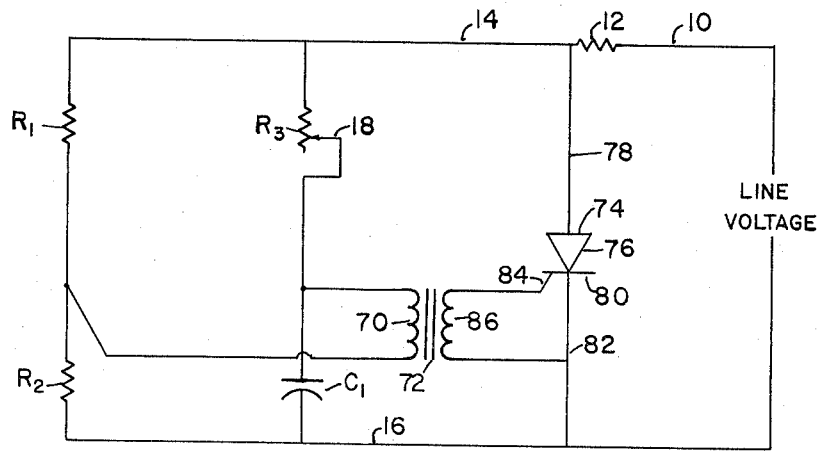
FIGURE 7 is a schemtic diagram illustrating the manner in which a three terminal asymmetrical device can be utilized to achieve half-wave power control.

The invention also can be utilized in conjunction with devices which are fired by applying a proper signal to a gate electrode. Turning now to FIGURE 7 of the drawing, it is seen that the phase shifting network is as described with reference to FIGURE 1. The primary winding 70 of a transformer 72 is connected directly between the points 20 and 26. The anode 74 of an asymmetrical three terminal device 76 is connected to the load 12 by a line 78. The cathode 80 of the device 76 is connected to the line 16 by a lead 82. The device 76 includes a gate electrode 84, which is connected to one side of the secondary winding 86 of the transformer 72 by lead 88. The other side of the transformer winding 86 is connected directly to the line 16.

The device 76 may be switched from the high impedance to the low impedance state either by creating a voltage in excess of the forward breakdown voltage of the device to cause breakdown, or the device 76 can be switched to the low impedance state by properly biasing the gate electrode 84 with respect to the cathode.

According to this embodiment of the invention, switching is obtained by applying a positive potential to the control electrode 84 through secondary winding 86. The gate current produced by the positive potential is sufficient to cause the device 76 to switch to its low impedance state due to transistor action. Power control is achieved in the manner previously described by controlling the phase relationship between the firing signal applied to the control electrode 84 through transformer 72 and the line voltage applied to the load.

The transformer 72 functions to provide the necessary isolation between the firing signal and the line voltage to obtain the desired phase difference. Transformer 72 may have a one to one turns ratio between the primary and secondary, or it may be a step up or a step down transformer depending upon the particular values of the voltage $e$ developed between points 20 and 26 of the phase shift network and the voltage required to be presented to the control terminal 84 to energize the device 76 from the high impedance to the low impedance state.

According to one specific example of this embodiment of the invention, the resistors $R_1$ and $R_2$ were each of 10,000 ohms resistance. The resistor $R_3$ was adjustable from 0–25,000 ohms and the capacitor $C_1$ was of 0.1 microfarad.

The transformer 72 was wound to have a ten to one turns ratio, with the secondary 86 being the low voltage winding. The resistance of the secondary winding 86 was 90 ohms. The transformer turns ratio must be such to insure against exceeding the permissible bias voltage for the particular device used. The resistance of the secondary winding is important in that it affects the biasing of the device, and must be such that with the anode positive and no gate signal applied, the gate current flowing due to leakage will not bias the device on.

The device 76 used was characterized by a forward breakdown voltage of 175 volts and a peak reverse voltage of 300 volts. Approximately 97% of full half wave power was provided when the resistor $R_3$ was adjusted for minimum resistance. As the resistance of resistor $R_3$ was increased, the power level decreased. The device 76 remained off when the resistor $R_3$ was adjusted for maximum resistance.

Figure 8:
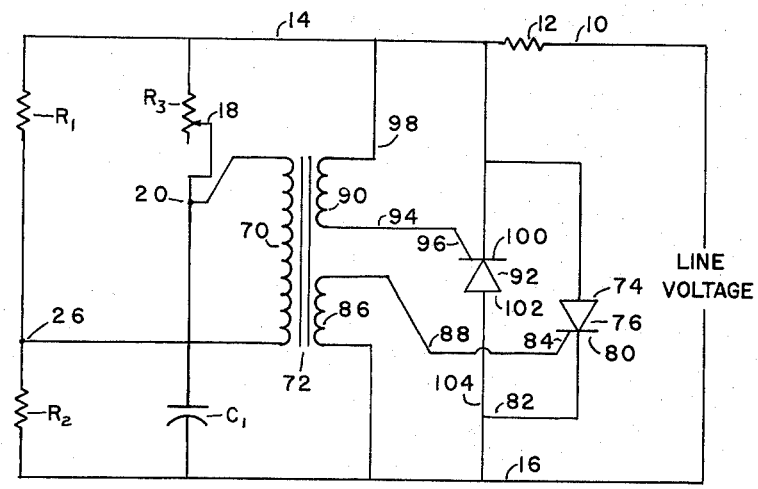
FIGURE 8 illustrates the manner in which full wave control of power can be achieved utilizing two oppositely poled three terminal asymmetrical devices.

The circuit shown in FIGURE 7 is readily converted to full wave control of power by adding a secondary winding 90 to the transformer 72 as shown in FIGURE 8, and connecting an oppositely poled three terminal device 92 between the lines 16 and the load 12.

According to this embodiment of the invention, one terminal of the winding 90 is connected through lead 94 to the gate electrode 96 of the device 92; and the other lead of the transformer winding 90 is connected by line 98 directly to the load 12. The cathode 100 of the device 92 is connected directly to the load 12, and the anode 102 of the device 92 is connected through line 104 to the line 16.

During positive half cycles, those half cycles in which the line 10 is positive with respect to the line 16, the signal $e$ developed across the primary winding 70 is applied by the windings 90 and 86 to the control electrodes 84 and 96 respectively of the devices 76 and 92 respectively. The polarity of the windings 86 and 90 is such that the signals applied to the control electrodes 84 will cause the device 76 to switch to the low impedance state whereas the signal applied to the control electrode 96 of the device 92 will bias device 92 away from conduction.

During negative half cycles, that is those half cycles in which the line 10 is negative with respect to the line 16, the anode 102 of the device 92 will be positive with respect to the cathode 100 and the signal applied to the control electrode 96 will be of proper polarity to cause device 96 to switch from the high impedance to the low impedance state allowing conduction during the negative half cycles through device 92. During negative half cycles, the signal applied to the electrode 84 of device 76 will bias it further away from conduction.

Figure 9:
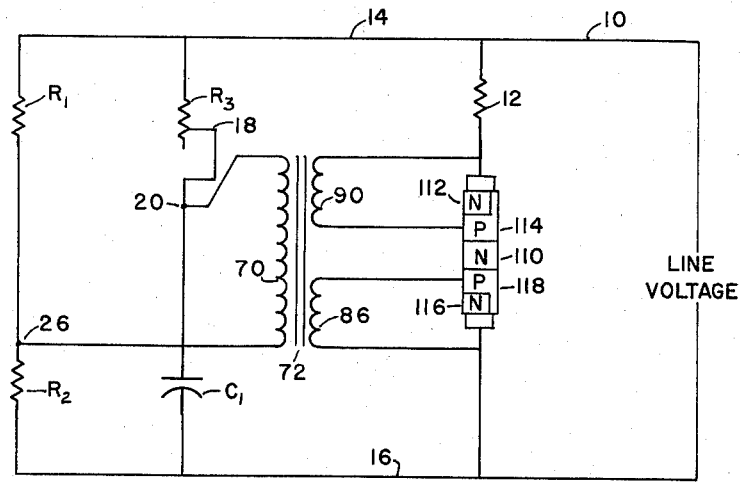
FIGURE 9 illustrates schematically the manner in which a symmetrical device can be utilized to achieve full wave control of the power applied to a load.

Full wave power control may also be achieved by utilizing a symmetrical device 110 as shown in FIGURE 9. The N-type region 116 of device 110 functions as the cathode when line 10 is positive with respect to line 16. If a positive signal is applied to the P-type region 118 by transformer winding 86 current flow will be permitted in the direction from line 10 to line 16.

During negative half cycles, that is half cycles in which line 16 is positive with respect to line 10, the N-type region 112 functions as the cathode. The signal applied to the P-type region 114 by secondary winding 90 will cause the device to switch from high impedance to low impedance state allowing current to flow through the load 12 in the direction from line 16 toward line 10. Control of the power is obtained by varying the phase relationship between the firing signal and the applied line voltage as described previously.

FIGURE 9 also illustrates the manner in which the phase shifting network is preferably connected directly to line voltage when the inventive circuitry is utilized to control a load that has a very low power factor. This is to insure that where highly inductive loads are controlled, sufficient potential will be available to the phase shift network to generate the necessary firing signal.

When the circuitry provided by the present invention is utilized to control three terminal devices by the application of a gate voltage, it is preferred that $R_1$ and $R_2$ be of substantially the same resistance to maintain the firing signal a constant amplitude. It is seen by reference to FIGURES 3A through 3C that if the devices are caused to switch to the low impedance state at a relatively low level of firing signal, as is desirable to achieve the capability of substantially full wave power, that the phase of the firing angle must be shifted from substantially in phase with the applied line voltage to lagging the applied line voltage by almost 180°. If the resistance of the resistors $R_1$ and $R_2$ is substantially different, the magnitude of the firing signal $e$ will vary considerably as shown by FIGURES 2D and 2E.

The transformer 72 must be designed to accommodate the highest voltage to be impressed across its primary winding. In view of the fact that the size of the transformer is directly related to the voltage impressed across the primary winding, a very desirable reduction in size of the transformer is obtained by using a circuit which provides a firing signal of constant, low amplitude. Still a further important advantage is obtained in that the possibility of damaging the devices due to excessive gate voltage is minimized.

A very important feature of the present invention is that the primary winding of the transformer is connected to the junction points 20 and 26 in each embodiment of the invention. In view of this, the circuit may be operated at relatively high signal levels using high impedance elements in the phase shift network. The power dissipated in the phase shifting network is minimized by the use of high impedance elements, allowing inexpensive components of small physical size to be used. Even when the resistance of the variable resistor $R_3$ is made very small, the current flowing through the resistor $R_3$ is limited to very low value by the impedance of resistor $R_2$ and capacitor $C_1$, allowing a potentiometer of small physical size to be used. It is to be noted, however, that if capacitor $C_1$ has a very large capacitance, it may be necessary to utilize a potentiometer in which the minimal resistance is in the order of hundreds of ohms.

The various circuits described in the preferred examples given herein are such that the power dissipated in the control circuitry is in the order of one half watt or less. The leakage current flowing through the load due to the phase shift circuit itself is in the order of a few milliamperes and, therefore, insignificant if the load is a low impedance one. If the impedance of the load is relatively high, the impedance of the components utilized in the phase shift network can be increased accordingly.

The impedance of the elements which can be used in the phase shift network is limited only to the extent that when used in conjunction with the embodiments of the invention shown in FIGURES 7, 8 and 9, sufficient current must be available in the phase shift network to bias the devices which control the flow of current through the load. When the present circuitry is utilized in connection with the embodiments of the invention shown in FIGURES 1, 5 and 6, the impedance of the components utilized in the phase shift network are limited only to the extent that the time constant of the charge path of capacitor $C_2$ must be sufficiently short to allow it to charge an amount sufficient to produce the necessary high voltage pulse to break down the control device.

Although the principles of the invention have been described in connection with certain specific embodiments, it is to be clearly understood that the description is made only by way of example and not as limitations to the scope of the invention as set forth in the accompanying claims.

What we claim is:

1. A switching circuit for controlling the power applied to a load from a source of alternating current supply voltage that comprises a first diode device capable of being switched from a normally high impedance state to a low impedance state, means for connecting said first device in series with a load and said source of alternating current supply voltage, a phase shift network having an output, means connecting said phase shift network in parallel with said first device to produce an alternating current voltage at said output, said phase shift network including a variable component for varying the phase relationship between the line voltage and the voltage produced at said output, a second diode device capable of being switched from a normally high impedance state to a low impedance state, a transformer having a primary winding and a secondary winding, a capacitor, means connecting said second device, said capacitor and said primary winding in a series loop, and means connecting said output across one of said second device and said capacitor, said first device being characterized by a forward breakdown voltage greater than the maximum instantaneous amplitude of the applied line voltage and said second device being characterized by a forward breakdown voltage less than the maximum instantaneous amplitude of the voltage produced at said output.

2. A switching circuit as defined in claim 1 wherein said first device and said second device are symmetrical.

3. A switching circuit as defined in claim 1 wherein said first and second devices are five layer semiconductor devices.

4. A switching circuit as defined in claim 1 wherein said first device and said second device are asymmetrical, said first device and said second device being connected to be capable of being switched to the low impedance state during one half cycle of applied alternating current power and not capable of being switched to the low impedance state during the other half cycle of applied alternating current power.

5. A switching circuit as defined in claim 4 wherein at least one of said first device and said second device is a four layer semiconductor diode.

6. A switching circuit as defined in claim 4 further including a third, oppositely poled, asymmetrical device connected in parellel with said first device and a fourth, oppositely poled, asymmetrical device connected in parallel with said second device, said third device having breakdown characteristics substantially the same as said first device and said fourth device having breakdown characteristics substantially the same as said second device.

7. A switching circuit for controlling the power applied to a load that comprises a first device having a cathode, an anode and two control electrodes, said device being capable of being switched from a normally high impedance state to a low impedance state, means connecting said first device in series with a load, phase shift means for producing a firing signal connected in parallel with said device, said phase shift means including means to vary the phase relationship between said firing signal and power applied to said load, transformer means including a primary winding and at least two secondary windings, means connecting said primary winding to receive said firing signal, means connecting one of said secondary windings to one of said control electrodes, and means connecting said second secondary winding to said second control electrode, said device being switched to the low impedance state to allow current flow in one direction during one half cycle of the power applied to said load, said device being switched to the low impedance state to allow current flow in the other direction during the other half cycle of the power applied to said load responsive to the presence of a firing signal.

8. A switching circuit as defined in claim 7 wherein said device is a five layer semiconductor device.

9. A switching circuit for controlling the power applied to a load through a thyratron type device by controlling the conduction of the device that comprises a thyratron type device connected in series with the load, said device being capable of being switched to a low impedance state from a normally high impedance state, phase shifting means for producing a signal having a desired phase relationship with the voltage applied to said load, said phase shifting means having sufficiently high impedance to allow said phase shift means to be connected directly to said load without adversely affecting said load, inductive means, means connecting said inductive means in series with said device, and means to induce a high voltage in said inductive means responsive to the presence of said signal to switch said device to the low impedance state, said phase shifting means including first resistive means including a first resistive element, a second resistive element, means connecting said first resistive element in series with said second resistive element, second resistive means including a third resistive element, first capacitance means, means connecting said third resistive element in series with said first capacitance means, and means connecting said first resistive means and said second resistive element in parallel with said second resistive means and said first capacitance means, said means connecting including a fourth resistive element connecting said first resistive element to said third resistive element, said fourth resistive element having a tap whereby movement of said tap in one direction increases the effective resistance of said first resistive means and decreases the effective resistance of said second resistive means and movement of said tap in the other direction decreases the effective resistance of said first resistive means and decreases the effective resistance of said second resistive means.

10. A switching circuit as defined in claim 9 further including a fifth resistive element connecting said tap to the juncture between said third resistive element and said fourth resistive element.

11. A switching circuit for controlling the alternating current power applied to a load from a source of alternating current supply voltage that comprises a first semiconductor device having first and second electrodes, said semiconductor device normally exhibiting a high impedance between said first and second electrodes but capable of being excited to exhibit a low impedance in at least one direction between said first and second electrodes, means connecting said first semiconductor device by said first and second electrodes in series with a load and the source of alternating current supply voltage, phase shifting means having its input connected in shunt with said first semiconductor device and effective to produce at its output an alternating current signal having a variable phase relationship with the source of alternating current supply voltage, a transformer having an input and an output, a capacitor, a semiconductor diode device which normally exhibits a high impedance which is excited to a low impedance state responsive to the voltage thereacross exceeding the breakover voltage of said diode device, means connecting the input winding of said transformer, said capacitor and said diode device in a series loop, means connecting the output of said phase shift network across one of said capacitor and said semiconductor diode device, and means connecting the output winding of said transformer to apply to said first semiconductor device a signal of a character to excite said first semiconductor device to the low impedance state responsive to said semiconductor diode device switching to the low impedance state.

12. A switching circuit for controlling the power applied to a load from a source of alternating current supply voltage that comprises a first semiconductor device having first and second electrodes, said semiconductor device normally exhibiting a high impedance between said first and second electrodes but capable of being excited to exhibit a low impedance in at least one direction between said first and second electrodes, means connecting said semiconductor device by said first and second electrodes in series with a load and a source of alternating current supply voltage, a phase shift network having an input and an output, means connecting the input of said phase shift network in shunt with said semiconductor device, said phase shift network being effective to produce at its output an alternating current signal of different phase than the alternating current supply voltage, a capacitor, means connecting said capacitor across the output terminals of said phase shift network, a second semiconductor device, means connecting one terminal of said second semiconductor device to one terminal of said capacitor, said second semiconductor device normally exhibiting a high impedance but being switched to a low impedance responsive to the charge on said capacitor attaining a level sufficient to cause said second semiconductor device to switch from said normally high impedance state to said low impedance state and means connecting said second semiconductor device to apply to said first semiconductor device a signal of a character to excite said first semiconductor device to the low impedance state responsive to said second semiconductor device switching to the low impedance state.

13. A switching circuit as defined in claim 12 wherein said phase shift network is constructed and arranged to produce an alternating current signal at its output which lags the applied alternating current supply voltage by more than 90° responsive to said variable element being adjusted for one extreme of impedance.

14. A switching circuit for controlling the power applied to a load from a source of alternating current supply voltage that comprises a first semiconductor device having first and second electrodes, said semiconductor device normally exhibiting a high impedance between said first and second electrodes but capable of being excited to exhibit a low impedance in at least one direction between said first and second electrodes, means connecting said semiconductor device by said first and second electrodes in series with a load and a source of alternating current supply voltage, a phase shift network having an input and an output, means connecting the input of said phase shift network in shunt with said semiconductor device, said phase shift network being effective to produce at its output an alternating current signal having a variable phase relationship to the alternating current supply voltage, a capacitor, means connecting said capacitor across the output terminals of said phase shift network, a semiconductor diode device, means connecting one terminal of said semiconductor diode device to one terminal of said capacitor, said diode device normally exhibiting a high impedance but being switched to a low impedance responsive to the charge on said capacitor becoming equal to the breakover voltage of said semiconductor diode, and means connecting the other electrode of said semiconductor diode device to apply to said first semiconductor device a signal to excite said first semiconductor device to the low impedance state.

15. A switching circuit as defined in claim 14 wherein said diode element is symmetrical.

References Cited by the Examiner
UNITED STATES PATENTS

| | | | |
|---|---|---|---|
| 2,228,844 | 1/41 | Palmer | 315—194 |
| 2,541,041 | 2/51 | Crenshaw | 315—84.5 |
| 3,103,618 | 9/63 | Slater | 307—88.5 |
| 3,142,781 | 7/64 | Izenour | 315—194 |

OTHER REFERENCES

"Notes on the Application of the Silicon Controlled Rectifier," General Electric Co., December 1958.

"SCR Manual," General Electric Co., 2d Edition, Dec. 29, 1961, pages 112–115.

References Cited by the Applicant
UNITED STATES PATENTS

| | | |
|---|---|---|
| 2,289,813 | 7/42 | Von Henke. |
| 2,843,765 | 7/58 | Aigrain. |
| 2,894,173 | 7/59 | Paradise. |
| 2,905,885 | 9/59 | Burt et al. |
| 2,910,641 | 10/59 | Boyer. |
| 2,917,698 | 12/59 | Petrocelli. |
| 2,944,164 | 7/60 | Odell. |
| 2,949,544 | 8/60 | Hill et al. |
| 2,953,693 | 9/60 | Philips. |
| 2,957,121 | 10/60 | Hierholzer. |
| 2,962,607 | 11/60 | Bright. |
| 2,965,772 | 12/60 | Swartout. |
| 2,981,849 | 4/61 | Gobat. |
| 2,993,129 | 7/61 | Petrocelli et al. |
| 3,023,357 | 2/62 | Hierholzer et al. |
| 3,030,523 | 4/62 | Pittman. |
| 3,040,194 | 6/62 | Jones et al. |
| 3,040,195 | 6/62 | Jones et al. |
| 3,058,009 | 10/62 | Shockley. |
| 3,066,230 | 11/62 | Kaufman. |
| 3,071,698 | 1/63 | Thompson et al. |
| 3,077,544 | 2/63 | Connelly. |
| 3,124,701 | 3/64 | Given. |

JOHN W. HUCKERT, *Primary Examiner.*

ARTHUR GAUSS, *Examiner.*